United States Patent
Gao et al.

(10) Patent No.: US 9,535,647 B2
(45) Date of Patent: Jan. 3, 2017

(54) APPARATUS, SYSTEM AND METHOD OF CHANNEL SWITCHING

(71) Applicant: INTEL CORPORATION, Santa Clara, CA (US)

(72) Inventors: Jie Gao, Sunnyvale, CA (US); Krishnan Rajamani, San Diego, CA (US); Ulun Karacaoglu, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 47 days.

(21) Appl. No.: 14/582,863

(22) Filed: Dec. 24, 2014

(65) Prior Publication Data

US 2016/0196097 A1 Jul. 7, 2016

(51) Int. Cl.
*G06F 3/14* (2006.01)
*H04W 76/04* (2009.01)
*H04W 76/02* (2009.01)

(52) U.S. Cl.
CPC .......... *G06F 3/1423* (2013.01); *H04W 76/023* (2013.01); *H04W 76/043* (2013.01)

(58) Field of Classification Search
CPC . G06F 3/1423; H04W 76/023; H04W 76/043; H04L 65/1069
See application file for complete search history.

(56) References Cited

U.S. PATENT DOCUMENTS

| | | | |
|---|---|---|---|
| 2009/0262709 A1* | 10/2009 | Mason | H04W 36/06 370/336 |
| 2010/0315997 A1* | 12/2010 | Kim | H04N 21/43615 725/109 |
| 2014/0347433 A1* | 11/2014 | Kafle | H04L 65/1069 348/14.02 |
| 2015/0179130 A1* | 6/2015 | Smadi | G09G 5/006 345/520 |
| 2015/0181487 A1* | 6/2015 | Konrad | H04L 51/04 370/329 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Alliance Technical Committee P2P Task Group; Wi-Fi Peer-to-Peer (P2P) Technical Specification; Version 1.2; Dec. 14, 2011; 160 pages.

* cited by examiner

*Primary Examiner* — Kevin M Nguyen
(74) *Attorney, Agent, or Firm* — Shichrur & Co.

(57) ABSTRACT

Some demonstrative embodiments include apparatuses, devices, systems and methods of channel switching. For example, a video source device may include a radio to establish a peer to peer (P2P) connection over a first wireless communication channel between the video source device and a video sink, the P2P connection to stream from the video source device to the video sink content to be displayed on a display device, and to receive from the video sink a message including type information indicating a type of the display device; and a controller to initiate, based on the type of the display device, a channel switch procedure to switch the P2P connection from the first wireless communication channel to a second wireless communication channel.

25 Claims, 5 Drawing Sheets

APPARATUS, SYSTEM AND METHOD OF CHANNEL SWITCHING

TECHNICAL FIELD

Embodiments described herein generally relate to channel switching.

BACKGROUND

A 2.4 Gigahertz (GHz) wireless communication band is being used by many wireless communication devices, e.g., a cordless phone, a baby video monitor, a microwave oven and/or Wireless Fidelity (WiFi) devices. As a result, a transmission from a video source device to a wireless display device of a video stream over the 2.4 GHz band may experience latency and/or may have a reduced quality.

A 5 GHz wireless communication band is being used less, e.g., compared to the 2.4 GHz band. Therefore, it may be beneficial to transmit the video stream over the 5 GHz wireless communication channel.

However, due to regulatory constraints, the 5 GHz wireless communication channel is restricted to be used only at an indoor location.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Bluetooth device, an Internet of Things (IoT) device, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); *IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz*

Band", 28 December, 2012); IEEE 802.11REVmc, IEEE 802.11x) and/or future versions and/or derivatives thereof, devices and/or networks operating in accordance with existing Wireless Fidelity (WiFi) Alliance (WFA) Peer-to-Peer (P2P) specifications (*WiFi P2P technical specification*, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing WirelessHD™ specifications and/or future versions and/or derivatives thereof, units and/or devices which are part of the above networks, devices and/or networks operating in accordance with existing Intel Wireless Display (WiDi) specifications and/or future versions and/or derivatives thereof, devices and/or networks operating in accordance with existing Miracast™ specifications and/or future versions and/or derivatives thereof, units and/or devices which are part of the above networks, and the like.

Some embodiments may be used in conjunction with one way and/or two-way radio communication systems, a Miracast Device, a WiDi device, a Miracast sink, a Miracast source, a wireless display device, a video source, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is at least one addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P")", as used herein, may relate to device-to-device communication over a wireless link ("peer-to-peer link") between a pair of devices. The P2P may include, for example, wireless communication over a direct link within a QoS basic service set (BSS), a tunneled direct-link setup (TDLS) link, a STA-to-STA communication in an independent basic service set (IBSS), or the like.

Figure 1:
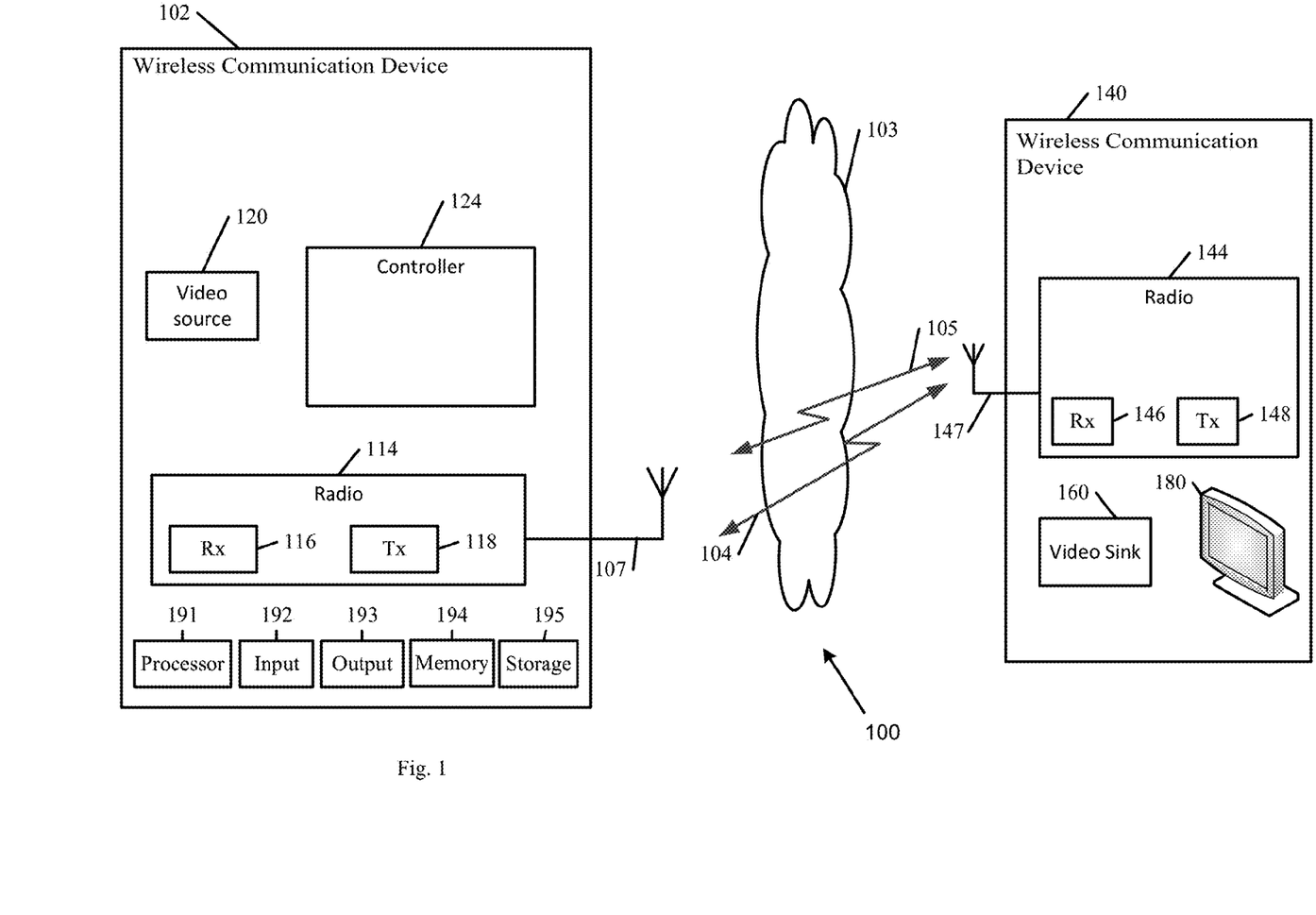
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102 and a wireless communication device 140.

In some demonstrative embodiments, wireless communication device 102 may include a video source device.

In some demonstrative embodiments, wireless communication device 102 may include a video source 120.

In some demonstrative embodiments, video source 120 may include a Miracast video source, a Wireless Display (WiDi) video source, or any other video source.

In some demonstrative embodiments, wireless communication device 140 may include a wireless display device.

In some demonstrative embodiments, wireless communication device 140 may include a video sink 160 to receive content from the video source via WM 103.

In some demonstrative embodiments, video sink 160 may include a Miracast sink, a Wireless Display (WiDi) sink, or any other video sink.

In some demonstrative embodiments, wireless communication device 140 may include a display device 180 to display the content, e.g., received via video sink 180.

In some demonstrative embodiments, display device 180 may include a television (TV), an LCD screen, a LED screen, or the like.

In some demonstrative embodiments, display device 180 and video sink 160 may be part of device 140.

In one example, device 140 may include a wireless display device having an embedded screen and a video sink module and/or capabilities.

In other embodiments, at least one of display device 180 and video sink 160 may not be part of device 140.

In one example, video sink 160 may not be part of device 140. For example, device 140 may include a TV, and video sink 160 may include a box or a plug attached to the TV, configured to provide video sink capabilities to the TV.

In another example, display device 180 may not be part of device 140. For example, display device 180 may include a TV, which does not have wireless capability, and device 140 may include a box or a plug attached to the TV, configured to provide video sink and/or wireless capabilities to the TV.

In some demonstrative embodiments, device 102 may include a mobile or portable device.

In other embodiments, device 102 may include a non-mobile or a static device.

In some demonstrative embodiments, wireless communication device 102, may include, for example, a PC, a desktop computer, a mobile computer, a laptop computer, a User Equipment (UE), an Internet of Things (IoT) device, a notebook computer, a tablet computer, an Ultrabook™ computer, a mobile internet device, a server computer, a hand-held computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, a video sink, a stereo tuner, a flat panel display, a Personal Media Player (PMP), a digital video camera (DVC), a gaming device, a Digital Still camera (DSC), a media player, a Smartphone, a television, or the like.

In some demonstrative embodiments, device 102 may also include, for example, a processor 191, an input unit 192, an output unit 193, a memory unit 194, and a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

Processor 191 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of device 102 and/or of one or more suitable applications.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display, a Liquid Crystal Display (LCD) display unit, a plasma display unit, one or more audio speakers or earphones, or other suitable output devices.

In some demonstrative embodiments, device 102 may be configured to stream content to be displayed on display device 180 from video source 120 to video sink 160.

In some demonstrative embodiments, device 102 may be configured to communicate with device 140, e.g., to stream the content from video source 120 to video sink 160.

In some demonstrative embodiments, devices 102 and 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, radio 114 may be configured to stream the content from video source 120 to video sink 160 over a first wireless communication channel 104 between devices 102 and 140 or over a second wireless communication channel 105 between devices 102 and 140.

In some demonstrative embodiments, first wireless communication channel 104 may include a 2.4 Gigahertz (GHz) wireless communication channel.

In some demonstrative embodiments, second wireless communication channel 105 may include a 5 GHz wireless communication channel.

In some demonstrative embodiments, the 2.4 GHz wireless communication channel may be congested, for example, when many wireless communication devices, e.g., a cordless phone, a baby video monitor, a microwave oven and/or Wireless Fidelity (WiFi) devices, are using the 2.4 GHz wireless communication channel.

In some demonstrative embodiments, streaming the content from video source 120 to video sink 160 over the 2.4 GHZ wireless communication channel may impact a user experience of a user of device 102. For example, streaming the content from video source 120 to video sink 160 over the 2.4 GHZ wireless communication channel may increase latency and/or may reduce quality of the video received at video sink 160.

In some demonstrative embodiments, the 5 GHz wireless communication channel may be less congested than the 2.4 GHZ wireless communication channel.

In some demonstrative embodiments, streaming the content from video source 120 to video sink 160 over the 5 GHZ wireless communication channel may improve the user experience of the user of device 102. For example, streaming the content from video source 120 to video sink 160 over the 5 GHZ wireless communication channel may reduce latency and/or may increase quality of the video received at video sink 160.

In some demonstrative embodiments, radio 114 may not be allowed to stream the content from video source 120 to video sink 160 over the 5 GHZ wireless communication channel, for example, due to regulatory restrictions, which restrict usage of the 5 GHZ wireless communication channel only to indoor locations.

In one example, radio 114 may not be allowed to stream the content from video source 120 to video sink 160 over the 5 GHZ wireless communication channel, for example, if devices 102 and 140 are not in an indoor location.

In some demonstrative embodiments, the regulatory restrictions may enable the usage of the 5 GHZ wireless communication channel, for example, only if the usage of the 5 GHZ wireless communication channel is determined to be in an indoor location.

Some demonstrative embodiments may enable to determine and/or to verify that the 5 GHZ wireless communication channel to stream the content from video source 120 to video sink 160 is to be used in an indoor location.

Some demonstrative embodiments may enable device 102 to acquire a display type of display device 180, and, if the display type indicates that device 180 is being used at an indoor location, device 102 may switch to the 5 GHZ wireless communication channel to stream the content from video source 120 to video sink 160, e.g., as described below.

In one example, device 102 may switch to the 5 GHZ wireless communication channel to stream the content from video source 120 to video sink 160, for example, if the display type is verified as a TV. According to this example, the indication that device 180 is a TV may indicate that device 180 is at the indoor location, e.g., since the TV is may be configured to be connected to an Alternate Current (AC) power via an AC power cable plugged to an AC wall socket, which is usually used in indoor locations.

In some demonstrative embodiments, device 102 may include a controller 124 configured to switch between the 5 GHz and 2.4 GHZ wireless communication channels.

In some demonstrative embodiments, controller 124 may include circuitry, e.g., processor circuitry, memory circuitry, Media-Access Control (MAC) circuitry, Physical Layer (PHY) circuitry, and/or any other circuitry, configured to perform the functionality of controller 124. Additionally or alternatively, one or more functionalities of controller 124 may be implemented by logic, which may be executed by a machine and/or one or more processors, e.g., as described below.

In some demonstrative embodiments, controller 124 may be configured to acquire the display type of display device 180, and to switch to the 5 GHZ wireless communication channel, for example, if the display type indicates that devices 102 and 140 are located in an indoor location, e.g., as described below.

In some demonstrative embodiments, radio 114 may establish a Peer to Peer (P2P) connection over first wireless communication channel 104 between device 102 and device 140.

In some demonstrative embodiments, the P2P connection may stream from video source 120 to video sink 160 content to be displayed on display device 180.

In some demonstrative embodiments, radio 114 may receive from video sink 160 a message including type information indicating a type of display device 180.

In some demonstrative embodiments, the type information may include an Extended Display Identification Data (EDID).

In some demonstrative embodiments, the EDID may include a data structure, which describes display capabilities of display device 180.

In some demonstrative embodiments, radio 114 may transmit to video sink 160 a request message to request the type information.

In some demonstrative embodiments, radio 144 may receive the request message, and may send to device 102 a response message including the type information, e.g., in response to the request message.

In some demonstrative embodiments, radio 114 may receive from video sink 160 the response message including the type information, e.g., in response to the request message.

In some demonstrative embodiments, the request message may be included in a real time steaming protocol (RTSP) request message.

In other embodiments, the request message may be included in a dedicated message to request the type information, for example, via a Transmission Control Protocol (TCP) connection, e.g., separate from the P2P connection.

In some demonstrative embodiments, the response message may be included in an RTSP response message.

In other embodiments, the response message may be included in a dedicated response message to provide the type information, for example, via the TCP connection.

In some demonstrative embodiments, the RTSP request message may include a get_parameter attribute to request the type information.

In other embodiments, the RTSP request message may include any other parameter to request the type information from display device 180.

In some demonstrative embodiments, controller 124 may receive the type information of display device 180, and may derive the type of display device 180, e.g., a TV, a tablet display, a notebook display, and the like.

In some demonstrative embodiments, controller 124 may initiate, based on the type of the display device, a channel switch procedure to switch the P2P connection from first wireless communication channel 104 to second wireless communication channel 105, e.g., to communicate over the 5 GHz wireless communication band instead of the 2.4 GHz wireless communication band.

In some demonstrative embodiments, controller 124 may initiate the channel switch procedure, for example, if video sink 160 supports communication over wireless communication channel 105.

In some demonstrative embodiments, controller 124 may determine if video sink 160 supports communication over wireless communication channel 105, for example, by examining capabilities of the P2P connection.

In some demonstrative embodiments, controller 124 may initiate the channel switch procedure, for example, if the type of display device 180 indicates that display device 180 is an indoor device.

In some demonstrative embodiments, controller 124 may initiate the channel switch procedure, for example, if the type of display device 180 indicates display device 180 is connected to an AC power supply.

In some demonstrative embodiments, controller 124 may initiate the channel switch procedure, for example, if the type of display device 180 indicates that display device 180 is a TV.

In some demonstrative embodiments, radio 114 may transmit to video sink 160 an extended channel switch announcement (ECSA) to switch the P2P connection from the first wireless communication channel 104 to the second wireless communication channel 105.

In some demonstrative embodiments, radio 144 may receive the ECSA and may switch to the second wireless communication channel 105.

In some demonstrative embodiments, radio 114 may stream the content over the second wireless communication channel 105, e.g., after completion of the channel switch procedure.

In some demonstrative embodiments, radio 114 may communicate over the first wireless communication channel 104, e.g., in addition to streaming the content from video source 120 to video sink 160 over wireless communication channel 105.

In one example, radio 114 may communicate over the second wireless communication channel 105, e.g., to stream the media content to be displayed on wireless display 180, and radio 114 may communicate over the first wireless communication channel 104 with an AP, e.g., to gain access to the Internet.

In some demonstrative embodiments, radio 114 may operate at a Dual Channel Mode (DCM) to switch between wireless communication channel 105, e.g., to stream the content from video source 120 to video sink 160, and wireless communication channel 104, e.g., to communicate with the AP.

In some demonstrative embodiments, using the DCM may enable to communicate over the 5 GHz band, which may be less congested than the 2.4 GHz wireless communication band, e.g., when streaming the media content, and to communicate over the 2.4 GHz wireless communication band when necessary, for example, to gain access to the Internet.

In some demonstrative embodiments, acquiring the type of display device 180 may enable using wireless communication channel 105, which may be less congested than the 2.4 GHz wireless communication band, at an indoor location, which may improve performance and/or user experience when streaming the content from video source 120 to video sink 160.

Figure 2:
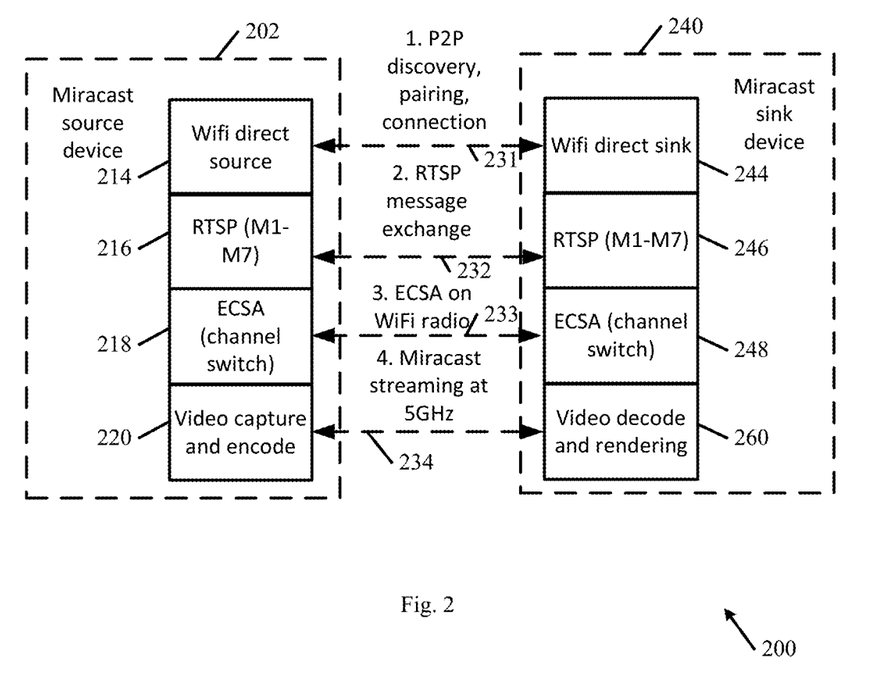
FIG. 2 is a schematic block diagram illustration of a sequence of operations between a source device and a sink device, in accordance with some demonstrative embodiments.

Reference is made to FIG. 2, which schematically illustrates a sequence of operations between a source device 202 and a sink device 140, in accordance with some demonstrative embodiments. For example, source device 202 may perform the functionality of wireless communication device 102 (FIG. 1), and/or sink device 240 may perform the functionality of wireless communication device 140 (FIG. 1).

In one example, source device 202 may include a Miracast source device, and/or sink device 240 may include a Miracast sink device.

As shown in FIG. 2, a WiFi direct source module 214 of device 102 and a WiFi direct sink module 244 of device 140 may perform a P2P connection establishment operation 231. For example, radios 114 and 144 (FIG. 1) may establish the P2P connection over WM 103 (FIG. 1), e.g., as described above.

As shown in FIG. 2, an RTSP module 216 of device 102 and an RTSP module 246 of device 140 may perform an RTSP message exchange 232. For example, radios 114 and 144 (FIG. 1) may exchange the RTSP request message and/or the RTSP response message, e.g., as described above.

As shown in FIG. 2, an ECSA module 218 of device 102 and an ECSA module 248 of device 140 may perform an ECSA operation 233 to switch the P2P connection between channels. For example, radios 114 and 144 (FIG. 1) may communicate the ECSA, e.g., as described above.

As shown in FIG. 2, a video capture and encode module 220 of device 102 and a video decode and render module 260 of device 140 may stream content 234 over the 5 GHZ wireless communication channel. For example, radios 114 and 144 (FIG. 1) may communicate the content from videos source 120 (FIG. 1) to video sink 180 (FIG. 1) over the second wireless communication channel 105 (FIG. 1), e.g., as described above.

Figure 3:
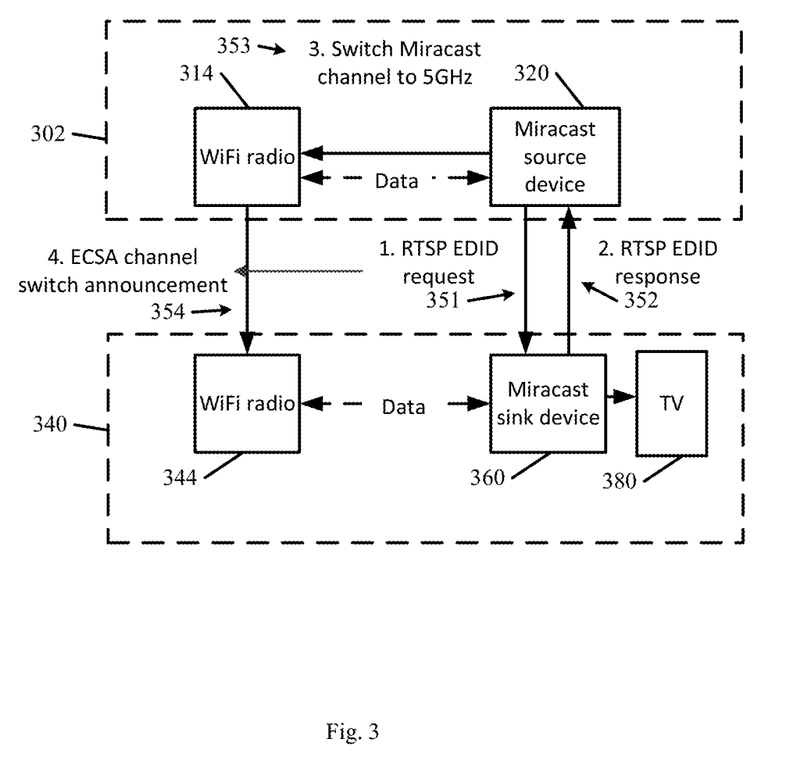
FIG. 3 is a schematic block diagram illustration of operations between first and second wireless communication devices, in accordance with some demonstrative embodiments.

Reference is made to FIG. 3, which schematically illustrates operations between a first wireless communication device 302 and a second wireless communication device 340 of a system, in accordance with some demonstrative embodiments. For example, the system of FIG. 3 may perform the functionality of system 100 (FIG. 1), device 302 may perform the functionality of wireless communication device 102 (FIG. 1), and/or device 340 may perform the functionality of wireless communication device 140 (FIG. 1).

As shown in FIG. 3, first wireless communication device 302 may include a Miracast source device 320, and a WiFi radio 314. For example, Miracast source device 320 may perform the functionality of video source 120 (FIG. 1), and/or WiFi radio 314 may perform the functionality of radio 114 (FIG. 1).

As shown in FIG. 3, second wireless communication device 340 may include a Miracast sink device 360, a WiFi radio 344, and a TV 380. For example, Miracast sink device 360 may perform the functionality of video sink 160 (FIG. 1), WiFi radio 344 may perform the functionality of radio 144 (FIG. 1), and/or TV 380 may perform the functionality of video device 180 (FIG. 1).

As shown in FIG. 3, Miracast source device 320 may transmit to Miracast sink device 360 an RTSP EDID request 351. For example, radio 114 (FIG. 1) may transmit the request message to device 140 (FIG. 1), e.g., as described above.

As shown in FIG. 3, Miracast sink device 360 may transmit to Miracast source device 320 an RTSP EDID response 352. For example, radio 114 (FIG. 1) may transmit the request message to device 140 (FIG. 1), e.g., as described above.

As shown in FIG. 3, device 302 may switch (353) to the 5 GHz wireless communication channel, for example, if TV 380 is connected to an AC power. For example, controller 124 (FIG. 1) may switch to second wireless communication channel 105, for example, if display device 180 (FIG. 1) is connected to the AC power, e.g., as described above.

As shown in FIG. 3, WiFi radio 314 may transmit an ECSA channel switch announcement 354 to WiFi radio 344. For example, radio 114 (FIG. 1) may transmit to device 140 (FIG. 1) the ECSA to switch the P2P connection to the second wireless communication channel 105 (FIG. 1), e.g., as described above.

Figure 4:
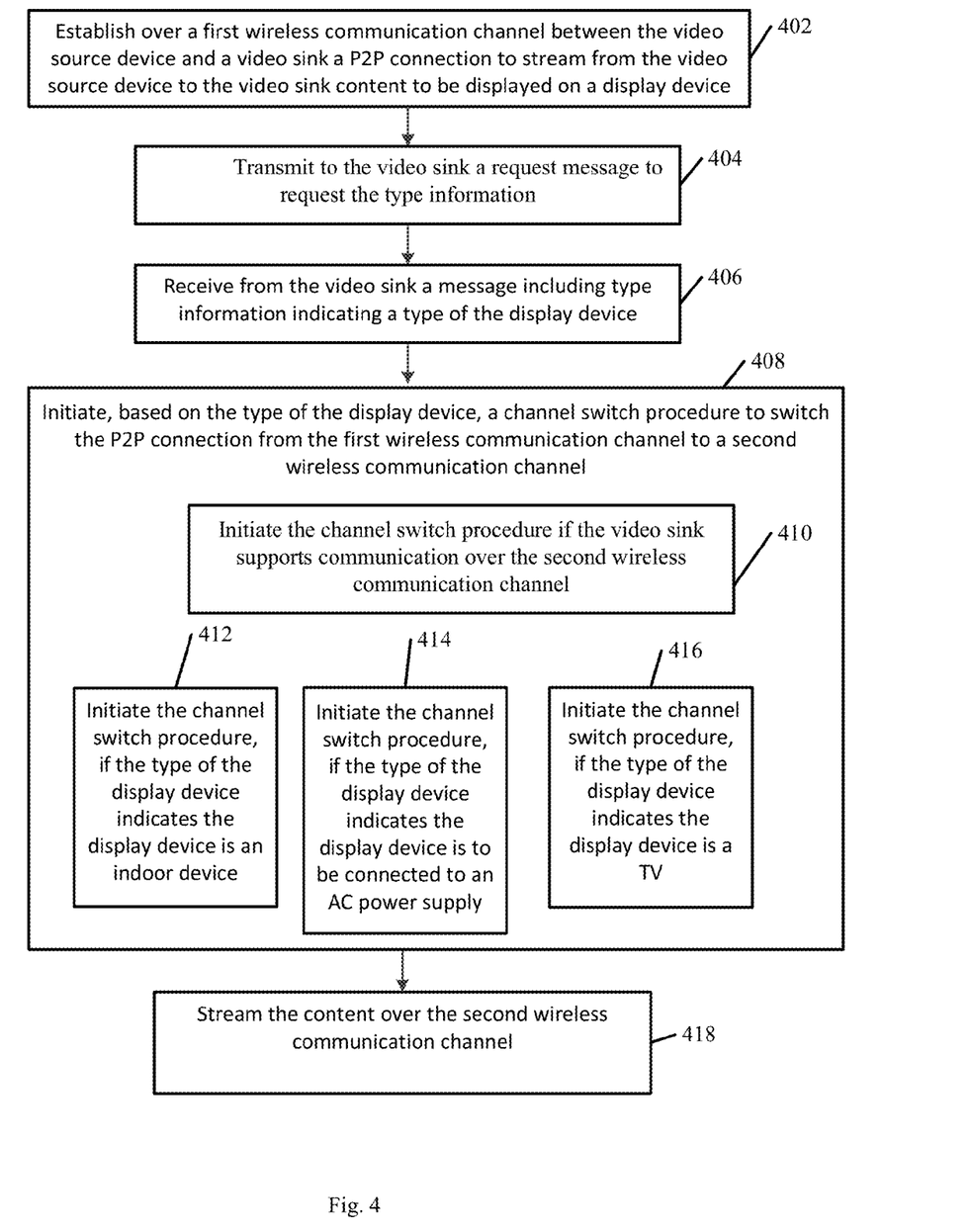
FIG. 4 is a schematic flow chart illustration of a method of channel switching, in accordance with some demonstrative embodiments.

Reference is made to FIG. 4, which schematically illustrates a method of channel switching, in accordance with some demonstrative embodiments. For example, one or more of the operations of the method of FIG. 4 may be performed by a wireless communication system, e.g., system 100 (FIG. 1); a wireless communication device, e.g., device 102 (FIG. 1), a radio, e.g., radio 114 (FIG. 1); a video source, e.g., video source 120 (FIG. 1); and/or a controller, e.g., controller 124 (FIG. 1).

As indicated at block 402, the method may include establishing over a first wireless communication channel between the video source device and a video sink a peer to peer (P2P) connection to stream from the video source device to the video sink content to be displayed on a display device. For example, radio 114 (FIG. 1) may establish the P2P connection over wireless communication channel 104 (FIG. 1) to stream from video source 120 (FIG. 1) to video sink 160 (FIG. 1) the content to be displayed on display device 180 (FIG. 1), e.g., as described above.

As indicated at block 404, the method may include transmitting to the video sink a request message to request type information corresponding to a type of the display device. For example, radio 114 (FIG. 1) may transmit to device 140 (FIG. 1) the request message to request the type information, e.g., as described above.

As indicated at block 406, the method may include receiving from the video sink a message including the type information indicating a type of the display device. For example, radio 114 (FIG. 1) may receive the message including the type information from video sink 160 (FIG. 1), e.g., as described above.

As indicated at block 408, the method may include initiating, based on the type of the display device, a channel switch procedure to switch the P2P connection from the first wireless communication channel to a second wireless communication channel. For example, controller 124 (FIG. 1) may initiate the channel switch procedure based on the type of the display device, e.g., as described above.

As indicated at block 410, initiating the channel switch procedure may include initiating the channel switch procedure, e.g., if the video sink supports communication over the second wireless communication channel. For example, controller 124 (FIG. 1) may initiate the channel switch procedure, for example, if video sink 160 (FIG. 1) supports communication over the second wireless communication channel 105 (FIG. 1), e.g., as described above.

As indicated at block 412, initiating the channel switch procedure may include initiating the channel switch procedure, e.g., if the type of the display device indicates the display device is an indoor device. For example, controller 124 (FIG. 1) may initiate the channel switch procedure, for example, if the type of display device 180 (FIG. 1) indicates that display device 180 (FIG. 1) is an indoor device, e.g., as described above.

As indicated at block 414, initiating the channel switch procedure may include initiating the channel switch procedure, e.g., if the type of the display device indicates the display device is to be connected to an AC power supply. For example, controller 124 (FIG. 1) may initiate the channel switch procedure, for example, if the type of display device 180 (FIG. 1) indicates that display device 180 (FIG. 1) is to be connected to the AC power supply, e.g., as described above.

As indicated at block 416, initiating the channel switch procedure may include initiating the channel switch procedure, e.g., if the type of the display device indicates the display device is a TV. For example, controller 124 (FIG. 1) may initiate the channel switch procedure, for example, if the type of display device 180 (FIG. 1) indicates that display device 180 (FIG. 1) is a TV, e.g., as described above.

As indicated at block 418, the method may include streaming the content over the second wireless communication channel. For example, radio 114 (FIG. 1) may stream the content over the second wireless communication channel 105 (FIG. 1), e.g., as described above.

Figure 5:
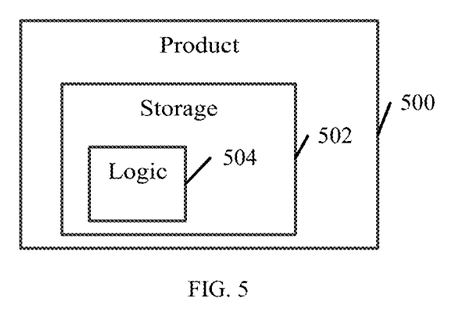
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), radio 114 (FIG. 1), video source 120 (FIG. 1), controller 124 (FIG. 1), to perform one or more of the operations of the sequence of operations of FIGS. 2 and/or 3, and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a video source device comprising a radio to establish a peer to peer (P2P) connection over a first wireless communication channel between the video source device and a video sink, the P2P connection to stream from the video source device to the video sink content to be displayed on a display device, and to receive from the video sink a message including type information indicating a type of the display device; and a controller to initiate, based on the type of the display device, a channel switch procedure to switch the P2P connection from the first wireless communication channel to a second wireless communication channel.

Example 2 includes the subject matter of Example 1, and optionally, wherein the radio is to stream the content over the second wireless communication channel.

Example 3 includes the subject matter of Example 1 or 2, and optionally, wherein the controller is to initiate the channel switch procedure, if the type of the display device indicates the display device is an indoor device.

Example 4 includes the subject matter of any one of Examples 1-3, and optionally, wherein the controller is to initiate the channel switch procedure, if the type of the display device indicates the display device is to be connected to an Alternate Current (AC) power supply.

Example 5 includes the subject matter of any one of Examples 1-4, and optionally, wherein the controller is to initiate the channel switch procedure, if the type of the display device indicates the display device is a television (TV).

Example 6 includes the subject matter of any one of Examples 1-5, and optionally, wherein the controller is to initiate the channel switch procedure if the video sink supports communication over the second wireless communication channel.

Example 7 includes the subject matter of any one of Examples 1-6, and optionally, wherein the type information includes an Extended Display Identification Data (EDID).

Example 8 includes the subject matter of any one of Examples 1-7, and optionally, wherein the radio is to transmit to the video sink a request message to request the type information, and to receive from the video sink, in response to the request message, a response message including the type information.

Example 9 includes the subject matter of Example 8, and optionally, wherein the request message is included in a real time streaming protocol (RTSP) request message, and the response message is included in an RTSP response message.

Example 10 includes the subject matter of Example 9, and optionally, wherein the RTSP request message includes a get_parameter attribute to request the type information.

Example 11 includes the subject matter of any one of Examples 1-10, and optionally, wherein the radio is to transmit to the video sink device an extended channel switch announcement (ECSA) to switch the P2P connection from the first wireless communication channel to the second wireless communication channel.

Example 12 includes the subject matter of any one of Examples 1-11, and optionally, wherein the first wireless communication channel comprises a 2.4 Gigahertz (GHz) wireless communication channel, and the second wireless communication channel comprises a 5 GHz wireless communication channel.

Example 13 includes the subject matter of any one of Examples 1-12, and optionally, comprising a Miracast video source or a Wireless Display (WiDi) video source.

Example 14 includes a system comprising a video source device, the video source device comprising one or more antennas; a memory; a processor; a radio to establish a peer to peer (P2P) connection over a first wireless communication channel between the video source device and a video sink, the P2P connection to stream from the video source device to the video sink content to be displayed on a display device, and to receive from the video sink a message including type information indicating a type of the display device; and a controller to initiate, based on the type of the display device, a channel switch procedure to switch the P2P connection from the first wireless communication channel to a second wireless communication channel.

Example 15 includes the subject matter of Example 14, and optionally, wherein the radio is to stream the content over the second wireless communication channel.

Example 16 includes the subject matter of Example 14 or 15, and optionally, wherein the controller is to initiate the channel switch procedure, if the type of the display device indicates the display device is an indoor device.

Example 17 includes the subject matter of any one of Examples 14-16, and optionally, wherein the controller is to initiate the channel switch procedure, if the type of the display device indicates the display device is to be connected to an Alternate Current (AC) power supply.

Example 18 includes the subject matter of any one of Examples 14-17, and optionally, wherein the controller is to initiate the channel switch procedure, if the type of the display device indicates the display device is a television (TV).

Example 19 includes the subject matter of any one of Examples 14-18, and optionally, wherein the controller is to initiate the channel switch procedure if the video sink supports communication over the second wireless communication channel.

Example 20 includes the subject matter of any one of Examples 14-19, and optionally, wherein the type information includes an Extended Display Identification Data (EDID).

Example 21 includes the subject matter of any one of Examples 14-20, and optionally, wherein the radio is to transmit to the video sink a request message to request the type information, and to receive from the video sink, in response to the request message, a response message including the type information.

Example 22 includes the subject matter of Example 21, and optionally, wherein the request message is included in a real time streaming protocol (RTSP) request message, and the response message is included in an RTSP response message.

Example 23 includes the subject matter of Example 22, and optionally, wherein the RTSP request message includes a get_parameter attribute to request the type information.

Example 24 includes the subject matter of any one of Examples 14-23, and optionally, wherein the radio is to transmit to the video sink device an extended channel switch announcement (ECSA) to switch the P2P connection from the first wireless communication channel to the second wireless communication channel.

Example 25 includes the subject matter of any one of Examples 14-24, and optionally, wherein the first wireless communication channel comprises a 2.4 Gigahertz (GHz) wireless communication channel, and the second wireless communication channel comprises a 5 GHz wireless communication channel.

Example 26 includes the subject matter of any one of Examples 14-25, and optionally, wherein the video source device comprises a Miracast video source or a Wireless Display (WiDi) video source.

Example 27 includes a method to be performed at a video source device, the method comprising establishing a peer to peer (P2P) connection over a first wireless communication channel between the video source device and a video sink, the P2P connection to stream from the video source device to the video sink content to be displayed on a display device; receiving from the video sink a message including type information indicating a type of the display device; and initiating, based on the type of the display device, a channel switch procedure to switch the P2P connection from the first wireless communication channel to a second wireless communication channel.

Example 28 includes the subject matter of Example 27, and optionally, comprising streaming the content over the second wireless communication channel.

Example 29 includes the subject matter of Example 27 or 28, and optionally, comprising initiating the channel switch procedure, if the type of the display device indicates the display device is an indoor device.

Example 30 includes the subject matter of any one of Examples 27-29, and optionally, comprising initiating the channel switch procedure, if the type of the display device indicates the display device is to be connected to an Alternate Current (AC) power supply.

Example 31 includes the subject matter of any one of Examples 27-30, and optionally, comprising initiating the channel switch procedure, if the type of the display device indicates the display device is a television (TV).

Example 32 includes the subject matter of any one of Examples 27-31, and optionally, comprising initiating the channel switch procedure if the video sink supports communication over the second wireless communication channel.

Example 33 includes the subject matter of any one of Examples 27-32, and optionally, wherein the type information includes an Extended Display Identification Data (EDID).

Example 34 includes the subject matter of any one of Examples 27-33, and optionally, comprising transmitting to the video sink a request message to request the type information, and receiving from the video sink, in response to the request message, a response message including the type information.

Example 35 includes the subject matter of Example 34, and optionally, wherein the request message is included in a real time streaming protocol (RTSP) request message, and the response message is included in an RTSP response message.

Example 36 includes the subject matter of Example 35, and optionally, wherein the RTSP request message includes a get_parameter attribute to request the type information.

Example 37 includes the subject matter of any one of Examples 27-36, and optionally, comprising transmitting to the video sink device an extended channel switch announcement (ECSA) to switch the P2P connection from the first wireless communication channel to the second wireless communication channel.

Example 38 includes the subject matter of any one of Examples 27-37, and optionally, wherein the first wireless communication channel comprises a 2.4 Gigahertz (GHz) wireless communication channel, and the second wireless communication channel comprises a 5 GHz wireless communication channel.

Example 39 includes the subject matter of any one of Examples 27-38, and optionally, wherein the video source device comprises a Miracast video source or a Wireless Display (WiDi) video source.

Example 40 includes a product including one or more tangible computer-readable non-transitory storage media comprising computer-executable instructions operable to, when executed by at least one computer processor, enable the at least one computer processor to implement a method at a video source device, the method comprising establishing a peer to peer (P2P) connection over a first wireless communication channel between the video source device and a video sink, the P2P connection to stream from the video source device to the video sink content to be displayed on a display device; receiving from the video sink a message including type information indicating a type of the display device; and initiating, based on the type of the display device, a channel switch procedure to switch the P2P connection from the first wireless communication channel to a second wireless communication channel.

Example 41 includes the subject matter of Example 40, and optionally, wherein the method comprises streaming the content over the second wireless communication channel.

Example 42 includes the subject matter of Example 40 or 41, and optionally, wherein the method comprises initiating the channel switch procedure, if the type of the display device indicates the display device is an indoor device.

Example 43 includes the subject matter of any one of Examples 40-42, and optionally, wherein the method comprises initiating the channel switch procedure, if the type of the display device indicates the display device is to be connected to an Alternate Current (AC) power supply.

Example 44 includes the subject matter of any one of Examples 40-43, and optionally, wherein the method comprises initiating the channel switch procedure, if the type of the display device indicates the display device is a television (TV).

Example 45 includes the subject matter of any one of Examples 40-44, and optionally, wherein the method comprises initiating the channel switch procedure if the video sink supports communication over the second wireless communication channel.

Example 46 includes the subject matter of any one of Examples 40-45, and optionally, wherein the type information includes an Extended Display Identification Data (EDID).

Example 47 includes the subject matter of any one of Examples 40-46, and optionally, wherein the method comprises transmitting to the video sink a request message to request the type information, and receiving from the video sink, in response to the request message, a response message including the type information.

Example 48 includes the subject matter of Example 47, and optionally, wherein the request message is included in a real time streaming protocol (RTSP) request message, and the response message is included in an RTSP response message.

Example 49 includes the subject matter of Example 48, and optionally, wherein the RTSP request message includes an attribute (get_parameter) to request the type information.

Example 50 includes the subject matter of any one of Examples 40-49, and optionally, wherein the method comprises transmitting to the video sink device an extended channel switch announcement (ECSA) to switch the P2P connection from the first wireless communication channel to the second wireless communication channel.

Example 51 includes the subject matter of any one of Examples 40-50, and optionally, wherein the first wireless communication channel comprises a 2.4 Gigahertz (GHz) wireless communication channel, and the second wireless communication channel comprises a 5 GHz wireless communication channel.

Example 52 includes the subject matter of any one of Examples 40-51, and optionally, wherein the video source device comprises a Miracast video source or a Wireless Display (WiDi) video source.

Example 53 includes an apparatus comprising means for establishing a peer to peer (P2P) connection over a first wireless communication channel between a video source device and a video sink, the P2P connection to stream from the video source device to the video sink content to be displayed on a display device; means for receiving from the video sink a message including type information indicating a type of the display device; and means for initiating, based on the type of the display device, a channel switch procedure to switch the P2P connection from the first wireless communication channel to a second wireless communication channel.

Example 54 includes the subject matter of Example 53, and optionally, comprising means for streaming the content over the second wireless communication channel.

Example 55 includes the subject matter of Example 53 or 54, and optionally, comprising means for initiating the channel switch procedure, if the type of the display device indicates the display device is an indoor device.

Example 56 includes the subject matter of any one of Examples 53-55, and optionally, comprising means for initiating the channel switch procedure, if the type of the display device indicates the display device is to be connected to an Alternate Current (AC) power supply.

Example 57 includes the subject matter of any one of Examples 53-56, and optionally, comprising means for initiating the channel switch procedure, if the type of the display device indicates the display device is a television (TV).

Example 58 includes the subject matter of any one of Examples 53-57, and optionally, comprising means for initiating the channel switch procedure if the video sink supports communication over the second wireless communication channel.

Example 59 includes the subject matter of any one of Examples 53-58, and optionally, wherein the type information includes an Extended Display Identification Data (EDID).

Example 60 includes the subject matter of any one of Examples 53-59, and optionally, comprising means for transmitting to the video sink a request message to request the type information, and means for receiving from the video sink, in response to the request message, a response message including the type information.

Example 61 includes the subject matter of Example 60, and optionally, wherein the request message is included in a real time streaming protocol (RTSP) request message, and the response message is included in an RTSP response message.

Example 62 includes the subject matter of Example 61, and optionally, wherein the RTSP request message includes a get_parameter attribute to request the type information.

Example 63 includes the subject matter of any one of Examples 53-62, and optionally, comprising means for transmitting to the video sink device an extended channel switch announcement (ECSA) to switch the P2P connection from the first wireless communication channel to the second wireless communication channel.

Example 64 includes the subject matter of any one of Examples 53-63, and optionally, wherein the first wireless communication channel comprises a 2.4 Gigahertz (GHz) wireless communication channel, and the second wireless communication channel comprises a 5 GHz wireless communication channel.

Example 65 includes the subject matter of any one of Examples 53-64, and optionally, wherein the video source device comprises a Miracast video source or a Wireless Display (WiDi) video source.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A video source device comprising:
   a radio to establish a peer to peer (P2P) connection over a first wireless communication channel between said video source device and a video sink, the P2P connection to stream from the video source device to the video sink content to be displayed on a display device, and to receive from said video sink a message including type information indicating a type of said display device; and
   a controller to initiate, based on said type of said display device, a channel switch procedure to switch the P2P connection from said first wireless communication channel to a second wireless communication channel.

2. The video source device of claim 1, wherein said radio is to stream said content over said second wireless communication channel.

3. The video source device of claim 1, wherein said controller is to initiate said channel switch procedure, if the type of said display device indicates said display device is an indoor device.

4. The video source device of claim 1, wherein said controller is to initiate said channel switch procedure, if the type of said display device indicates said display device is to be connected to an Alternate Current (AC) power supply.

5. The video source device of claim 1, wherein said controller is to initiate said channel switch procedure, if the type of said display device indicates said display device is a television (TV).

6. The video source device of claim 1, wherein said controller is to initiate said channel switch procedure if said video sink supports communication over said second wireless communication channel.

7. The video source device of claim 1, wherein said type information includes an Extended Display Identification Data (EDID).

8. The video source device of claim 1, wherein said radio is to transmit to said video sink a request message to request said type information, and to receive from the video sink, in response to said request message, a response message including said type information.

9. The video source device of claim 8, wherein said request message is included in a real time streaming protocol (RTSP) request message, and said response message is included in an RTSP response message.

10. The video source device of claim 9, wherein said RTSP request message includes an attribute (get_parameter) to request said type information.

11. The video source device of claim 1, wherein said radio is to transmit to said video sink an extended channel switch announcement (ECSA) to switch said P2P connection from said first wireless communication channel to said second wireless communication channel.

12. The video source device of claim 1, wherein said first wireless communication channel comprises a 2.4 Gigahertz (GHz) wireless communication channel, and said second wireless communication channel comprises a 5 GHz wireless communication channel.

13. The video source device of claim 1 comprising a Miracast video source or a Wireless Display (WiDi) video source.

14. A system comprising a video source device, the video source device comprising:
    one or more antennas;
    a memory;
    a processor;
    a radio to establish a peer to peer (P2P) connection over a first wireless communication channel between said video source device and a video sink, the P2P connection to stream from the video source device to the video sink content to be displayed on a display device, and to receive from said video sink a message including type information indicating a type of said display device; and
    a controller to initiate, based on said type of said display device, a channel switch procedure to switch the P2P connection from said first wireless communication channel to a second wireless communication channel.

15. The system of claim 14, wherein said radio is to stream said content over said second wireless communication channel.

16. The system of claim 14, wherein said controller is to initiate said channel switch procedure, if the type of said display device indicates said display device is an indoor device.

17. A method to be performed at a video source device, the method comprising:
    establishing a peer to peer (P2P) connection over a first wireless communication channel between said video source device and a video sink, the P2P connection to stream from the video source device to the video sink content to be displayed on a display device;
    receiving from said video sink a message including type information indicating a type of said display device; and
    initiating, based on said type of said display device, a channel switch procedure to switch the P2P connection from said first wireless communication channel to a second wireless communication channel.

18. The method of claim 17 comprising streaming said content over said second wireless communication channel.

19. The method of claim 17 comprising initiating said channel switch procedure, if the type of said display device indicates said display device is an indoor device.

20. The method of claim 17 comprising initiating said channel switch procedure if said video sink supports communication over said second wireless communication channel.

21. A product including one or more tangible computer-readable non-transitory storage media comprising computer-executable instructions operable to, when executed by at least one computer processor, enable the at least one computer processor to implement operations at a video source device, the operations comprising:
   establishing a peer to peer (P2P) connection over a first wireless communication channel between said video source device and a video sink, the P2P connection to stream from the video source device to the video sink content to be displayed on a display device;
   receiving from said video sink a message including type information indicating a type of said display device; and
   initiating, based on said type of said display device, a channel switch procedure to switch the P2P connection from said first wireless communication channel to a second wireless communication channel.

22. The product of claim 21, wherein said operations comprise streaming said content over said second wireless communication channel.

23. The product of claim 21, wherein said operations comprise initiating said channel switch procedure, if the type of said display device indicates said display device is an indoor device.

24. The product of claim 21, wherein said operations comprise initiating said channel switch procedure, if the type of said display device indicates said display device is to be connected to an Alternate Current (AC) power supply.

25. The product of claim 21, wherein said operations comprise transmitting to said video sink a request message to request said type information, and receiving from the video sink, in response to said request message, a response message including said type information.

* * * * *